United States Patent [19]

Takeda et al.

[11] Patent Number: 4,498,521
[45] Date of Patent: Feb. 12, 1985

[54] MOLTEN METAL LEVEL CONTROL IN CONTINUOUS CASTING

[75] Inventors: Susumu Takeda, Danville, Calif.; Allen W. Mann, Spokane, Wash.; David G. Goodrich, Danville; Theodore C. Zinniger, Livermore, both of Calif.

[73] Assignee: Kaiser Aluminum & Chemical Corporation, Oakland, Calif.

[21] Appl. No.: 266,788

[22] Filed: May 26, 1981

[51] Int. Cl.³ ............................................. B22D 11/16
[52] U.S. Cl. ..................... 164/453; 164/454
[58] Field of Search ............... 164/453, 454, 457, 449, 164/450, 155, 156, 413, 467, 468

[56] References Cited

U.S. PATENT DOCUMENTS

| | | | |
|---|---|---|---|
| 2,962,778 | 12/1960 | Peak et al. | 220/79 |
| 3,441,079 | 4/1969 | Bryson | 164/89 |
| 3,646,988 | 3/1972 | Getselev | 164/251 |
| 4,004,631 | 1/1977 | Goodrich | 164/467 |
| 4,014,379 | 3/1977 | Getselev | 164/4 |
| 4,156,451 | 5/1979 | Getselev | 164/49 |
| 4,161,206 | 7/1979 | Yarwood et al. | 164/49 |
| 4,186,792 | 2/1980 | Yamada et al. | 164/150 |
| 4,213,496 | 7/1980 | Yarwood | 164/147 |
| 4,226,278 | 10/1980 | Osugi | 164/444 |
| 4,349,066 | 9/1982 | Schmid | 164/453 |

FOREIGN PATENT DOCUMENTS

| | | | |
|---|---|---|---|
| 754168 | 2/1971 | Belgium. | |
| 122659 | 9/1980 | Japan | 164/453 |

Primary Examiner—Nicholas P. Godici
Assistant Examiner—Richard K. Seidel
Attorney, Agent, or Firm—John S. Rhoades

[57] ABSTRACT

This invention is directed to the process and system for controlling the level of molten metal in a plurality of vertically oriented, continuous or semicontinuous casting units, particularly electromagnetic casting units. The flows of molten metal to the individual casting units are adjusted automatically in response to a control set point signal from a master controller in order to maintain essentially the same molten metal level in all of the casting units. Improved startup and termination procedures are also given.

11 Claims, 7 Drawing Figures

4,498,521

MOLTEN METAL LEVEL CONTROL IN CONTINUOUS CASTING

BACKGROUND OF THE INVENTION

This invention relates to the molten metal level control in vertical, continuous or semicontinuous casting assemblies and particularly to such casting units wherein an electromagnetic field generated by an annular inductor surrounding the column of molten metal is used to shape the solidifying metal.

Aluminum ingots or billets which have been continuously or semicontinuously direct chill (DC) cast in conventional, open ended, tubular molds are usually characterized by various degrees of surface defects such as cold folds, liquations, hot tears and the like, which result primarily from the contact between the mold and the solidifying embryonic metal shell. Conventional DC cast ingots or billets are also characterized by considerable alloy segregation at the surface due to the sequential steps of initial cooling and partial solidification of the molten metal surface from contacting the chill surfaces of the mold bore, the reheating of the metal surface after the metal contracts away from the mold bore and then the final solidification of the molten metal by conduction toward the direct application of coolant. The conventionally DC cast ingots or billets usually require scalping to remove both the surface defects and the alloy impoverished zone adjacent to the surface before subsequent fabrication such as rolling, forging and the like.

Electromagnetic casting is quite similar to conventional DC casting except that, instead of the tubular shaped mold used in the conventional process, an annular inductor is employed to generate an electromagnetic field around the column of molten metal which in turn develops radial pressure on the column of molten metal sufficient to control the shape thereof until the metal is solidified into its final shape by the direct application of coolant. In the operation of electromagnetic casting units, no contact is made with the embryonic metal shell during solidification, so the aforementioned surface defects are for the most part eliminated. Moreover, due to the lack of contact between the embryonic metal shell and a chill surface of a mold bore, there is essentially no alloy impoverished zone adjacent to the ingot or billet surface and thus the electromagnetically cast metal is very homogeneous throughout its entire cross section. There is usually no need to scalp the electromagnetically cast material prior to fabrication and, as an added feature, the homogeneous structure reduces considerably or eliminates the edge cracking characteristic of conventional DC cast ingot during hot rolling.

The electromagnetic field in EM casting is produced by a ring-type inductor and the interaction of the electromagnetic field generated by the inductor with the eddy currents induced in the molten metal within the inner peripheral area of the inductor generate the electromagnetic pressure which controls the cross sectional shape of the solidifying metal. The radial force components control the lateral position of molten metal and nothing contacts the solidifying molten metal until coolant is applied to the metal surface as it emerges from the bottom of the inductor. Solidification of the metal is effected primarily by the axial conduction of heat away from the molten metal toward the portion of solidified metal on which the coolant is applied.

The inductor is preferably powered by a high frequency electrical source (e.g. 500 to 15000 cycles per second) because at the higher frequencies the induced currents in the molten metal concentrate at the surface of the solidifying metal (commonly termed "skin effect") so there is very little turbulence caused in the body of the molten metal.

Further information on the principles of electromagnetic casting can be found in U.S. Pat. No. 2,686,864 (Wroughton et al) USSR Inventor's Certificate No. 233186 and U.S. Pat. Nos. 3,467,166; 3,605,865; 3,646,988; 3,702,155; 3,773,101; 3,985,179 and 4,004,631.

In order for ingot or billet to be EM cast with constant cross sectional dimensions along the axial length thereof, the radial component of the electromagnetic pressure must continually be in a dynamic equilibrium with the hydrostatic pressure of the molten metal. Exercising the control necessary for the dynamic equilibrium is considerably more difficult than it first appears because minor changes in the electromagnetic field, in the drop rate, or in the height of molten metal can have a significant effect on the cross sectional dimensions of the resultant ingot or billet. Care must be exercised, particularly during startup, because a localized pressure of molten metal can exceed the radial electromagnetic pressure resulting in excursions of molten metal over the bottom block which, when solidified, resemble icicles on the butt end of the ingot or billet. While it is difficult enough to cast one ingot or billet having constant cross sectional dimensions along its length, it becomes even more difficult to exercise such control when a plurality of ingots or billets are cast at the same casting station.

Several schemes have been developed in an attempt to overcome the dimensional control problems but none appear to have been widely accepted. In U.S. Pat. No. 4,014,379 the electrical current level to the inductor is controlled in response to deviations sensed in the height of the molten metal in the inductor. Similarly, although apparently limited to copper, in U.S. Pat. No. 4,161,206 the electrical current to the inductor is controlled in response to deviations in the distance between the inner surface of the inductor and the vertical surface of the column of molten metal. In both cases the electrical current level in the inductor is varied to adjust the electromagnetic pressure to compensate for any differences between the distance measured and that desired.

Although these prior processes may control the dimensions of the ingot or billet to a certain extent, the dimensional control is believed considerably less accurate than that desired. Moreover, these processes by themselves are not readily amenable to controlling the electromagnetic casting of a plurality of ingots or billets in a single casting station. It is to these problems that the present invention is directed.

DESCRIPTON OF THE INVENTION

This invention is directed to a method for controlling the level of molten metal in a plurality of vertically oriented continuous or semicontinuous casting units and particularly such casting units in which a radial pressure generated by an electromagnetic inductor controls the shape of the molten metal until it solidifies into its final shape.

In accordance with this invention, the flow of molten metal to each casting unit is controlled so that the level of molten metal in each casting unit is maintained in essentially the same plane throughout most of the cast.

To facilitate this control, each of the casting units is accurately fixed to a table or similar support structure so that the inductors or molds are on the same level. The support structure or structures for the bottom blocks are adapted so that all of the ingots or billets are dropped at the same rate.

The level control in accordance with the invention is effected by sensing the molten metal level in each of the casting units, generating signals representing each of the molten metal levels sensed and comparing these individual signals with a set point signal from a master controller representing the desired molten metal level in all of the casting units. If there is a predetermined difference between the signal representing the level sensed in a particular unit and the signal representing the desired level, the flow of molten metal to that particular casting unit is automatically regulated as needed to bring the molten metal level in that particular casting unit to the desired level. During the period of control after startup, the level of molten metal in each of the individual casting units generally should not vary by more than 0.10 inch (0.25 cm), preferably less than 0.05 inch (0.13 cm). Additionally, after the initial startup period, the level of molten metal in all of the inductors at the same casting station preferably should not vary by more than 0.10 inch (0.25 cm) from each other. If these limits are not maintained, significant variations can be obtained in cross sectional dimensions along the length of individual ingots or billets and between the cross sectional dimensions of ingots or billets cast in the same drop.

Startup of a plurality of EM casting units presents a most difficult problem because the molten metal in all of the EM casting units must be brought up to the same specified level before the bottom blocks begin to drop without significant freezing of molten metal in the transfer trough or in any of the casting units and without any significant excursions of molten metal over the edge of the bottom block which is positioned within the inductor at the start of the cast. The casting assemblies farthest away from the molten metal source may have a tendency to freeze up first so the flow of molten metal to those casting units farthest away from the molten metal source is greater than those closer to the metal source. Preferably, all of the casting units are choke fed, i.e. the flow through the down spout to the casting unit is less than maximum molten metal flow, at all times during the cast to allow some measure of control.

The initial molten metal flow rates to the casting units at startup are set relatively high in comparison to the remainder of the cast and can be manually or automatically controlled. However, in accordance with one embodiment of the invention, the automatic molten metal level control procedure is initiated when the molten metal level in any one of the casting units reaches a predetermined level. In this automatic procedure, a molten metal level set point signal for all of the casting units is generated by a master controller. The signal increases with respect to time and preferably is a ramping set point. The fill rate necessary to meet the increasing molten metal level required by the set point is less than the initial metal flow rates to the casting units so that all of the units can catch up to the required level. Once the metal level in each casting unit reaches the required level it is controlled to the increasing set point to the final desired level. Preferably, the increasing or ramping set point control signal has two or more stages with the rate of change of level with respect to time being less in the latter stages than the initial stage in order to minimize overshooting the final desired molten metal level. It is preferred to start the bottom block descent just before the molten metal level in all of the casting units reaches the final desired level. A suitable time would be when the metal level is about 0.25 to 0.50 inch (0.64 to 1.27 cm) from the final level.

The final molten metal level is automatically maintained throughout the cast within the limits previously mentioned. At the end of the cast the molten metal source is plugged off and the molten metal in the trough is allowed to drain into the casting assemblies until the specified metal level in any of the casting units can no longer be maintained. At this time the trough is lifted, allowed to drain completely into a container and then removed from the casting area so that the table can be lifted or otherwise moved and the ingots or billets can be removed from the casting pit. When the trough is lifted for draining, those casting units closer to drain container will receive more molten metal than those further away so it is desirable to reduce the levels of molten metal in those casting units closer to the drain before the end of the cast so that all of the ingots and billets are of approximately the same length. The change in molten metal head height is relatively small, e.g. less than an inch (2.54 cm) and for large sheet ingots typically 0.1 to 0.5 inch (0.24 to 1.27 cm).

At the end of the cast coolant application to the surface of the ingots or billets at the exit or discharge end of the inductors or molds is continued until the solidification is complete and the end of the ingot or billet is discharged from the inductor or mold.

The level control described herein is suitable for use in a wide variety of casting units. In the operation of EM casting units, the height of molten metal within the inductor is integrally related with the electromagnetic pressure generated by the electromagnetic field. In a preferred embodiment the electromagnetic field and resultant pressure is maintained constant with the height or level of the column of molten metal in the inductor being the controlled variable. This control strategy requires the inductor current to be at essentially the same amplitude and frequency in each of the casting units. Other control strategies are possible.

Reference is made to the drawings which illustrate the invention in greater detail.

Figure 1:
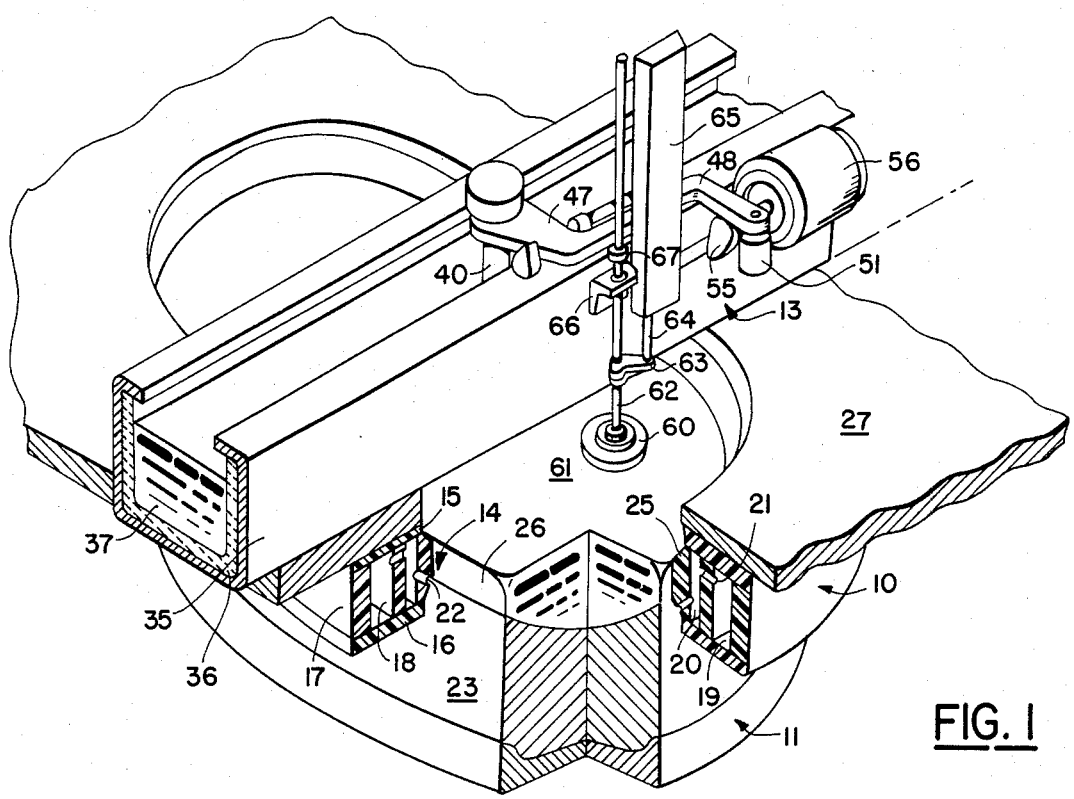
FIG. 1 is a perspective view, partially in section, of an EM casting unit.
Figure 2:
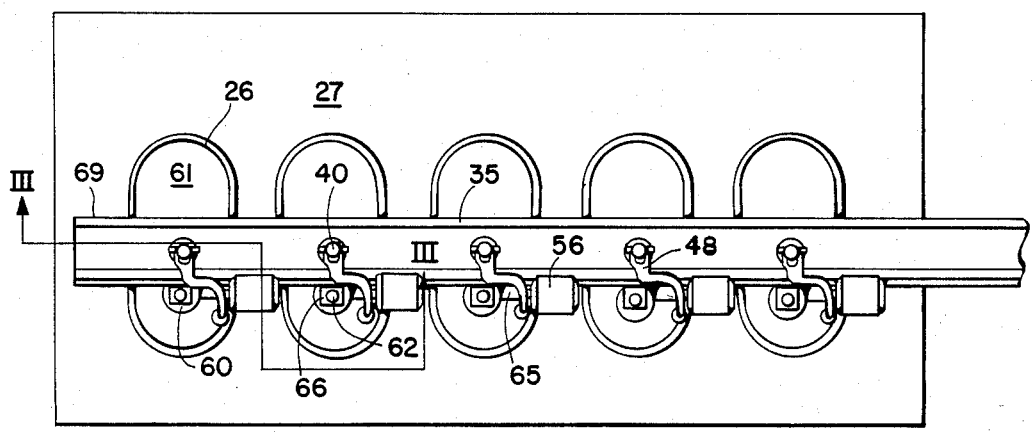
FIG. 2 is a top view of several EM casting units at a single casting station.
Figure 3:
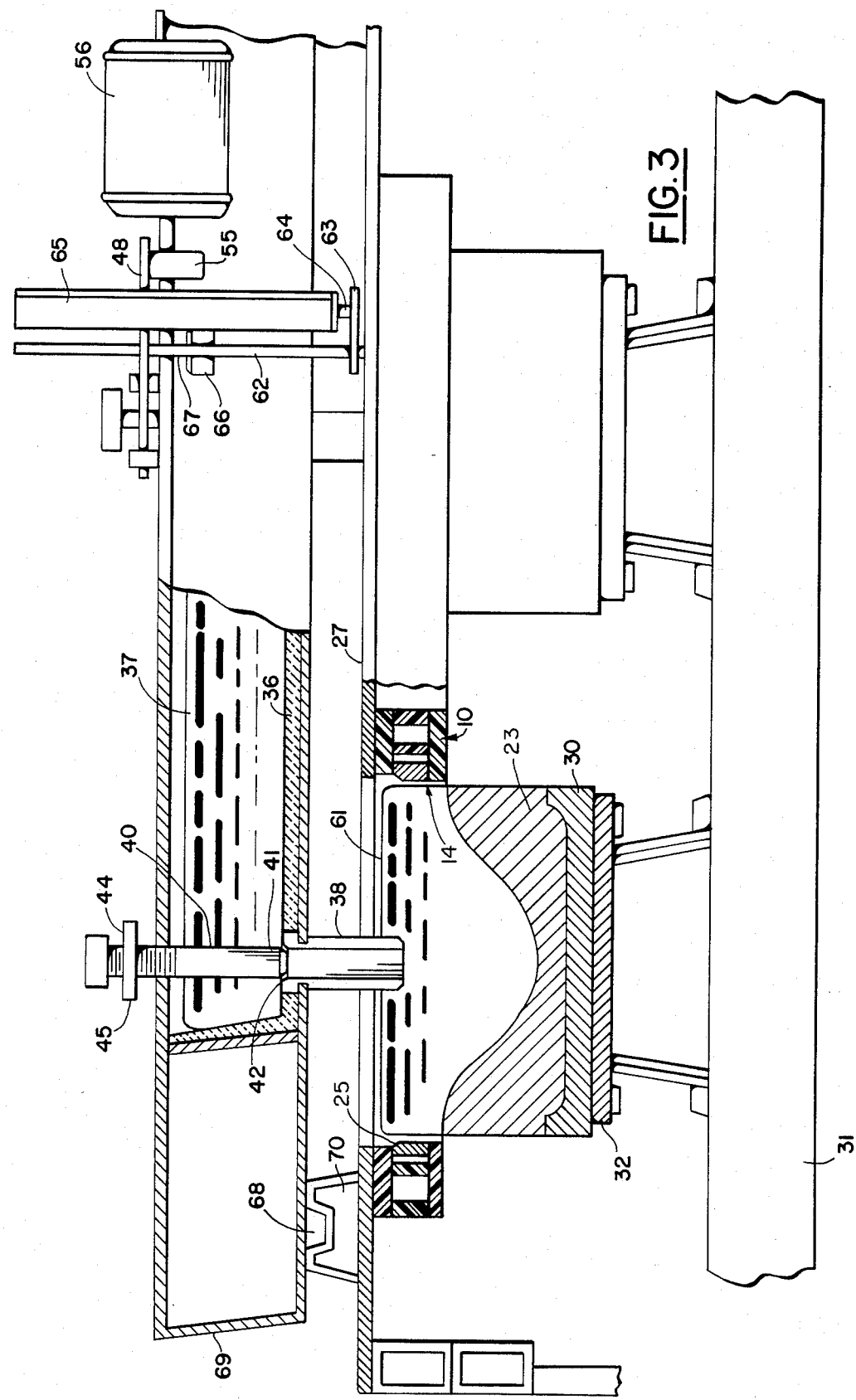
FIG. 3 is a side view, partially in section, of two EM casting assemblies taken along the lines III—III in FIG. 2.

With particular reference to FIGS. 1-3, the electromagnetic casting apparatus generally comprises a coolant jacket-inductor assembly 10, a bottom block assembly 11 and a molten metal feeding assembly 13.

The coolant jacket-inductor assembly 10 comprises an electromagnetic inductor 14 as the innermost wall of the assembly which is fixed in a sealed relationship with top member 15, bottom member 16 and backwall 17. A baffle wall 18 adjacent to the backwall of inductor 14 and concentric therewith divides the interior of the assembly 10 into two annular coolant chambers 19 and 20. The baffle member 18 is provided with conduit 21 for directing coolant from chamber 19 to chamber 20. The coolant from chamber 20 passes through the discharge conduits 22 provided in the lower portion of inductor 14 onto the solidifying ingot or billet 23. The coolant jacket members 15, 16, 17 and 18 are preferably made from nonmetallic materials such as suitable plastic materials.

The upper portion 25 of electromagnetic inductor 14 is preferably inclined away from the vertical axis of the coolant jacket-inductor assembly 10 as shown to reduce and to control more accurately the electromagnetic forces on the upper part of column 26 of the molten metal in accordance with U.S. Pat. No. 3,985,179 (Goodrich et al). The angle of the surface 25 with the vertical axis of the assembly 10 depends upon such factors as the metal head, the size of the ingot or billet, and the like. Usually the desired angle is empirically determined and ranges from about 10° to 50°.

The inductor 14 is metallic, e.g. copper or aluminum, and is preferably protected from accidental contact with the molten metal by a nonmetallic coating or surface (not shown) which does not significantly effect the electromagnetic field generated by the inductor.

The coolant jacket-inductor assemblies 10 are attached in a suitable manner (not shown) to the casting table 27, which may be hinged on one side or mounted on rollers so that the table 27 and the attached assemblies 10 can be moved out of the way at the end of the cast to allow removal of the cast ingots or billets 23 from the casting pit.

The bottom block assembly 11 is best illustrated in FIG. 3. As shown, each of the bottom blocks 30 is supported by and attached to the same table or support surface 31 by means of pedestal 32 in order to eliminate any variation in drop rate between the casting units. The lowering of support surface or platen 31 should be smooth and be done at a uniform rate, because any sudden movements can detrimentally affect the size and shape of the ingot or billet. The bottom blocks 30 can be individually lowered, if desired, but it is more convenient to support them all on the same platen 31 as is done conventionally and lower the platen 31 to lower all of the bottom blocks.

The molten metal feeding assembly 13 comprises feed trough 35, preferably formed from suitable nonmagnetic material such as stainless steel, which has a refractory lining 36. Molten metal 37 is distributed to a plurality of EM casting assemblies 10 by means of downspouts 38 which protrude into the inner peripheral area of inductors 14. Molten metal flow to the inductor 14 is controlled by flow control pin or valve plug 40. The lower end 41 thereof is adapted to seat in the recess 42 provided in the upper portion of downspout 38.

Figure 4:
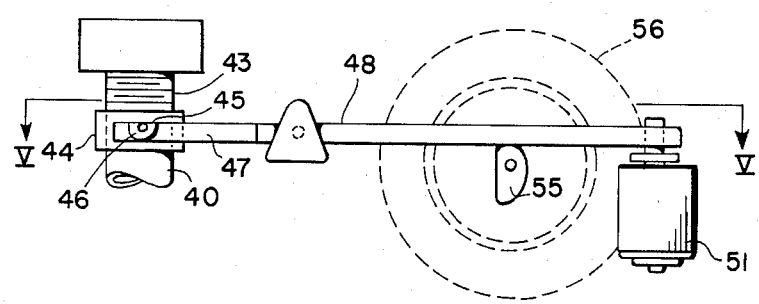
FIGS. 4 and 5 are side and top views of the valve actuating arm assembly which regulates the flow of molten metal from the trough into the mold or inductor.
Figure 5:
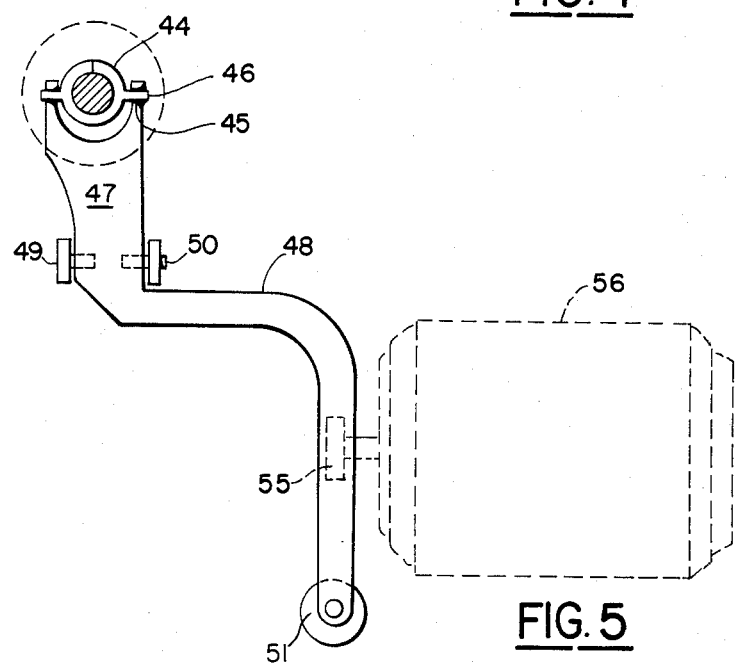

As shown more clearly in FIGS. 4 and 5 the upper part 43 of flow control pin or valve plug 40 is preferably threaded and is provided with a corresponding threaded collar 44 for minor adjustments in the position of pin or plug 40 with respect to the recess 42.

The collar 44 has arms 45 which are seated in the recesses 46 provided in yoke 47 of lever arm 48. The lever arm 48 is pivoted at points 49 and 50 so that, upon rotation of arm 48 about these points, the flow control pin 40 is raised or lowered thereby regulating the flow of molten metal to the inner periphery of inductor 14.

The end of arm 48 is provided with a balancing weight 51.

The movement of lever arm 48 is effected by the rotation of cam 55 which is driven by motor or rotary actuator 56 in response to a suitable control signal. The cam 55 preferably has the shape of a spiral of Archimedes as shown in the drawing because with such a shape each unit of angular rotation of cam 55 will provide an equal unit of linear displacement of the lever arm 48 and thus the flow control pin 40.

Each pin or plug 40 is preferably preset remotely via the motor or rotary actuator 56 before casting begins to provide a predetermined valve opening. Those casting units farthest away from the molten metal source should have greater openings and thus greater molten metal flow than those casting units closest to the molten metal source. These adjustments compensate for the initial flow to the casting units closer to molten metal source and also help to prevent freeze up before the casting begins.

Molten metal level sensing in each of the casting units is accomplished by means of a float 60 which rests on the upper surface 61 of the column of molten metal 26 within the inductor 14. The float 60 is operatively connected by means of rod 62 and connector element 63 to shaft 64 of displacement transducer 65 which provides an output signal representing the level of molten metal sensed by the float 60. Guide element or bracket 66 is fixed to the side of trough 35 for guiding the vertical displacement of rod 62 during casting. Collet 67 is provided on rod 62 to stop downward movement of the float 60 during noncasting periods.

The displacement transducer 65 should have a range of about 4 inches and should be accurate within 0.01 inches (0.025 cm), preferably within 0.005 inches (0.013 cm). A suitable transducer is Model 2000 HPA sold by the Schaevitz Corp. of New York, N.Y. Although the level sensing and signal generating unit is primarily described herein as a float operatively connected to a linear displacement transducer, it is evident that other means can be employed for sensing the level and generating a signal representing the level sensed.

The vertical positioning of the float 60 is very important for the accurate control of the molten metal level 61 in the inductor 14. The float material generally should not absorb molten metal or impurities and it must retain its integrity throughout the cast in order to prevent any change in the displacement of the float 60 on the molten metal surface 61. A suitable material for the float is MARINITE ® which is a lightweight fibrous refractory material (magnesium silicate) manufactured by the Johns Manville Corp.

The trough 35, as shown in FIG. 3, is accurately positioned on the casting table 27 because the displacement transducer 65 is fixed to the trough and accurate placement of the transducer is necessary at the time the trough is put into position to accurately measure the molten metal level in the inductor 14. The positioning of trough 35 is effected by one or more cone shaped male members 68 at the end 69 of trough 35 which are adapted to be accurately seated in female receptacles 70. The opposite end of the trough 35 is accurately fixed to the discharge side or trough of a filter-degasser unit which is not shown.

Figure 6:
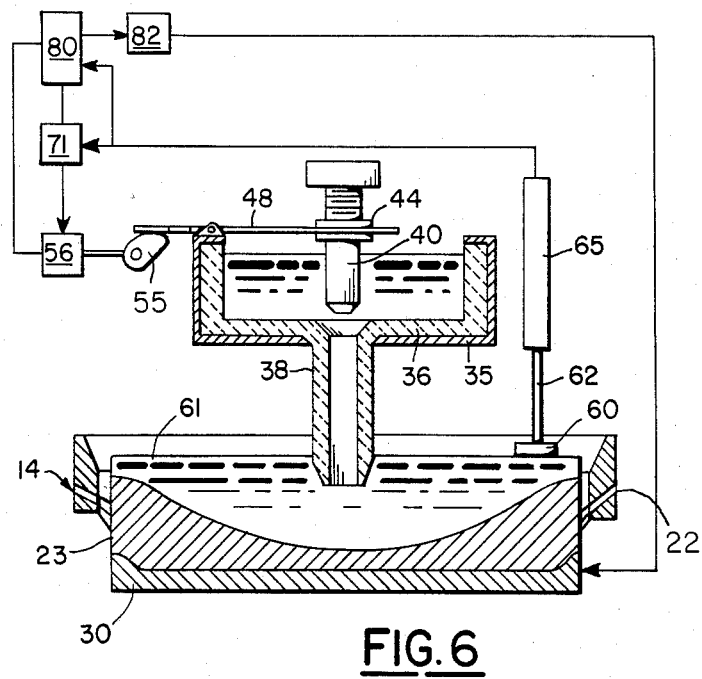
FIG. 6 is a schematic drawing of the molten metal level control system.

The molten metal level control system for all of the casting units, which is shown schematically in FIG. 6, includes a master or supervisory controller 80 which provides directions and molten metal level set point signal to local controllers 71 associated with each individual casting unit. Each of the local controllers 71 compares the signal representing the condition sensed e.g. molten metal level, with the signal from the master controller 80 representing the desired set point and then directs corrective action as required. In order to simplify FIG. 6 only one partial casting unit is shown. The master controller 80 also can direct other activities such as the lowering of the bottom blocks through controller 82 and controlling the flow of coolant.

A suitable controller unit for the master controller 80 is the Model No. 484 Modicon controller sold by the Gould Company, Modicon Division in Andover, Mass., and suitable local controllers 71 are Electromax III sold by the Leeds & Northrup Co. in North Wales, Pa.

During casting, the molten metal level 61 is sensed by float 60 and causes displacement transducer 65 to generate a signal representing the metal level sensed. The sensed metal level signal is directed to local controller 71 which compares the sensed metal level signal with a signal from the master controller 80 representing the desired molten metal level. Any differences will cause the controller 71 to direct a control signal to the drive motor or rotary actuator 56 to rotate the cam 55 and thereby raise or lower flow control pin 40 to appropriately regulate the flow of molten metal to the casting unit so that the upper surface 61 of the molten metal is maintained at the desired level.

A suitable rotary actuator is Model No. SM-1180 actuator produced and sold by Foxboro/Jordan, Inc., Milwaukee, Wis. A Foxboro/Jordan amplifier such as Model AD 7530 is usually included to drive the actuator.

The master controller 80 directs the same desired molten metal level set point signal to each of the local controllers 81 for the individual EM casting assemblies so that the metal level in each of the casting assemblies is in essentially the same horizontal plane. Because of this, each of the EM casting units, including each of the inductors, the level floats and the displacement transducers must be accurately positioned at the same relative level. To avoid thermal distortion during casting, which can cause misalignment of casting assembly components, it is preferred to water cool the trough 35 and the inductor assembly.

Figure 7:
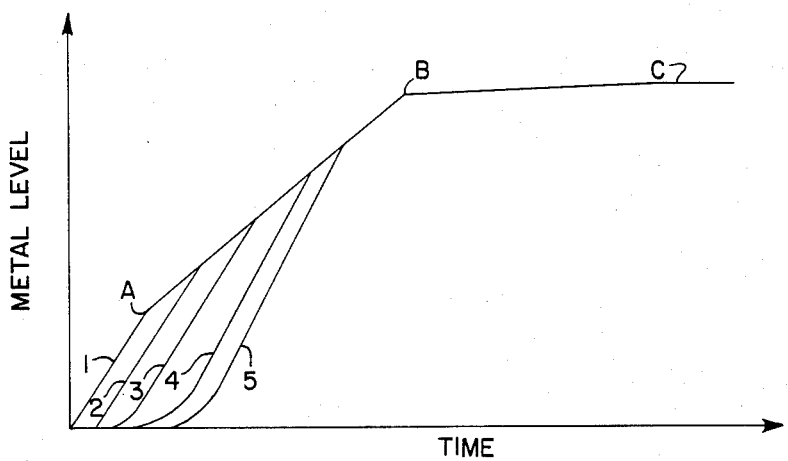
FIG. 7 is a graph illustrating molten metal head height control at the startup of casting. In the drawings all corresponding parts are given the same number.

The start of EM casting is the most difficult part of the casting to control because the system at the time is not in dynamic equilibrium and many things can go wrong. A particularly effective startup procedure for the present invention is shown graphically in FIG. 7. In accordance with this embodiment of the invention, the flow control plugs 40 are positioned at the start so that the flow of molten metal is greatest to the casting units farthest from the molten metal source, to thereby equalize, as much as possible, molten metal flow to all of the units and to minimize freeze up problems. Floats 60 rise as the metal level rises in the bowl shaped bottom blocks 30 positioned within the inductors 14 at the start of the cast. When the molten metal level 61 sensed in any one of the casting units reaches a predetermined initial level, shown as point A in FIG. 7, the master controller 80 sends a ramping set point signal representing the desired metal level with respect to time (line AB in FIG. 7) to the individual local controllers 71 to regulate the flow of molten metal to the individual casting units. The position of flow control pin 40 is automatically adjusted by means of the rotary actuator 56 to provide the metal head height prescribed by the ramping set point signal from the master controller 80. The molten metal level of the casting unit which initiates the automatic control follows the line AB in FIG. 7 and this casting unit is identified as #1 in FIG. 7. In the operation of the other casting units, shown as #2-5 in FIG. 7, the local controllers 71 adjust the flow control pins 40 to regulate the metal flow in order for the metal levels in casting units 2-5 to catch up to the moving set point. The levels of molten metal in all of the casting units reach the level required by the ramping set point and are following the same before reaching a predetermined molten metal level shown as Point B in FIG. 7. At point B the rate of change of the ramping set point signal from the master controller 80 is reduced, concomitantly reducing the rate of molten metal level increase. This is shown as line BC in FIG. 7. The metal level in all of the casting units follows this slower fill rate because it allows the metal levels in the casting units to slowly approach the final desired level (point C in FIG. 7) without significantly overshooting the limit. Bottom block movement is initiated at a predetermined metal level or time just before the metal reaches the final level in all of the casting units in the last stage, e.g. when the metal is within 0.25 inch (0.63 cm) from the final desired level.

Once the molten metal level 61 reaches the final desired level, it is automatically maintained throughout the cast. Minor adjustments to the molten metal level during the cast can be made by manually commanding a new setpoint to the local controller 71 via the master controller 80. The control must be tight because any small changes in the molten metal head height, as previously discussed, will generate significant variations in ingot or billet dimensions. Preferably, the system should initiate an audio and/or visual alarm if the local controller 81 can not maintain the molten metal level in the inductor. For safety purposes, it is preferred to program the local controllers 71 to drive the flow control pins 40 closed upon any significant drop in the electromagnetic field. The cast is terminated by shutting off the flow of molten metal from the source, either manually or automatically, and allowing the molten metal in the trough to drain into the casting units. The termination is initiated at some predetermined point in the process (e.g. based on time or length of cast metals) to provide the ingot or billet length desired, taking into consideration the amount of molten metal remaining in the trough when flow from the molten metal source ceases. Minor changes in the molten metal levels may be desirable prior to the time the molten metal source is plugged off in order to compensate for any differences in the amount of molten metal flowing to the various casting units. Frequently it is found that those farthest from the molten metal source receive less metal than those closest when molten metal flow from the source is stopped. Coolant application to the ingot or billet surface preferably continues until the ends of the ingots or billets exit from the discharge ends of the casting units and the ingot has completely solidified.

The system and method of the invention allows for very close control of the ingot or billet size and shape. For example when EM casting 5 ingots nominally 19×43×138 inches (48.3×109.2×350.5 cm) in size, the maximum deviation of the largest cross sectional dimension found along the length of the ingot (excluding normal butt swell) was less than 0.1 inch (0.25 cm). Between ingots the maximum deviation was less than 0.25 inch (0.64 cm).

It is obvious that various modifications can be made to the invention without departing from the spirit thereof and the scope of the appended claims.

We claim:

1. A method for controlling the level of molten metal in a plurality of vertically disposed continuous or semi-continuous conventional D.C. or E.M. casting units having feed and discharge ends during the startup thereof so that the molten metal levels in the casting units are maintained in essentially the same horizontal plane at the end of the startup, wherein molten metal flows to the upper feed ends of the casting units and solidified or partially solidified ingots or billets supported by bottom blocks exit from the discharge ends of the casting units at the same rate comprising:
   A. simultaneously and precisely sensing the level of molten metal in each of said casting units;
   B. generating signals representing the molten metal level sensed in each of said casting units;
   C. when the molten metal in any of the casting units reaches a predetermined level, generating a set point signal which increases in magnitude with respect to time and which represents a desired molten metal level which rises to a final level over a period of time;
   D. comparing each of the signals representing the molten metal level sensed in each of the casting units with the increasing set point signal representing the rising molten metal level desired;
   E. regulating the flow of molten metal to the individual casting units in response to differences between the signals compared to control the molten metal level in each of the casing units to essentially the same desired rising level; and
   F. when the molten metal levels in all of the casting units are in essentially the same horizontal plane, dropping the bottom blocks so the solidified or partially solidified ingot or billets exit from the discharge ends of the casting units at the same rate.

2. The method of claim 1 in which the period of increasing molten metal levels in the casting units has two stages and wherein the rate at which the molten metal levels increase with respect to time in the first stage is greater than the rate at which the molten metal levels increase in the second stage.

3. The method of claim 2 in wherein the molten metal levels in all of the casting units reach the level required by the increasing set point signal and are in essentially the same horizontal plane by the end of the first stage.

4. The method of claim 1 wherein the means to shape the molten metal while it solidifies in the casting units are electromagnetic annular inductors which generate the electromagnetic field and the resultant electromagnetic pressure on the molten metal within the inductor to control the shape of the molten metal until it solidifies into its final shape.

5. The method of claim 4 wherein the amplitude and frequency of the electrical current to each of the annular inductors is essentially the same and remains essentially the same through the period of increasing metal levels.

6. The method of claim 1, including the step of allowing a greater flow of molten metal to those casting units located farther away from the molten metal source than to the casting units located closest to the molten metal source.

7. The method of claim 1, in which the molten metal levels in all of the casting units reach essentially the same horizontal plane before reaching said final level.

8. The method of claim 1, wherein the set point signal increases at a first rate for a first period of time and thereafter increases at a second rate to the final level.

9. The method of claim 8, wherein the molten metal levels in all of the casting units reach essentially the same horizontal rising plane during said first period of time.

10. The method of claim 9, wherein said second rate is lower than said first rate.

11. The method of claim 10, wherein the molten metal levels in the casting units are maintained in essentially the same horizontal rising plane up to said final level and are thereafter maintained within 0.10 inch of each other at said final level.

* * * * *

UNITED STATES PATENT AND TRADEMARK OFFICE
CERTIFICATE OF CORRECTION

PATENT NO. : 4,498,521
DATED : February 12, 1985
INVENTOR(S) : Susumu Takeda et al It is certified that error appears in the above-identified patent and that said Letters Patent are hereby corrected as shown below:

Column 7, Line 36, "controllers 81" should be --controllers 71--

Column 10, Line 18, "through" should be --throughout--

Signed and Sealed this

Fourteenth Day of January 1986

[SEAL]

Attest:

Attesting Officer

DONALD J. QUIGG

Commissioner of Patents and Trademarks